United States Patent [19]
Iacobovici et al.

[11] Patent Number: 5,995,967
[45] Date of Patent: Nov. 30, 1999

[54] FORMING LINKED LISTS USING CONTENT ADDRESSABLE MEMORY

[75] Inventors: Sorin Iacobovici, San Jose; William R. Bryg, Saratoga; Joseph H. Hassoun, Pleasanton, all of Calif.

[73] Assignee: Hewlett-Packard Company, Palo Alto, Calif.

[21] Appl. No.: 08/734,003

[22] Filed: Oct. 18, 1996

[51] Int. Cl.⁶ .................................................. G06F 17/30
[52] U.S. Cl. ..................... 707/100; 711/108; 711/118; 707/1
[58] Field of Search ................................. 711/108, 119, 711/158, 3, 118; 707/1, 100

[56] References Cited

U.S. PATENT DOCUMENTS

| | | | |
|---|---|---|---|
| 3,848,234 | 11/1974 | MacDonald | 711/119 |
| 4,366,551 | 12/1982 | Holtz et al. | 707/1 |
| 4,785,398 | 11/1988 | Joyce et al. | 711/3 |
| 5,283,882 | 2/1994 | Smith et al. | 465/49 |
| 5,657,472 | 8/1997 | Van Loo et al. | 711/158 |

*Primary Examiner*—Jack M. Choules

[57] ABSTRACT

A linked list structure in a computing system includes a first entry and additional entries. Each additional entry includes a link reference to a prior entry in the linked list. The link reference for each additional entry all are stored within a content addressable memory. Each additional entry is accessible by performing a content search using the link reference to the prior entry. The linked list is traversed by accessing the first entry in the linked list. A second entry in the linked list is accessed by searching the content addressable memory with an index of the first entry. A third entry in the linked list is accessed by searching the content addressable memory with an index of the second entry.

13 Claims, 13 Drawing Sheets

FORMING LINKED LISTS USING CONTENT ADDRESSABLE MEMORY

BACKGROUND

The present invention concerns computing devices and pertains particularly to the formation of linked lists using content addressable memory.

Linked lists are useful constructs in many applications. One such application is ensuring cache coherency in a multiprocessor (MP) system. Organizing accesses to the same memory line in a linked list allows these requests to be serviced in the arrival order even in the presence of conflicts. This ensures fairness and prevents starvation problems that could occur when conflicts are resolved using retry or other methods.

A cache memory is a small, high-speed buffer memory which is used to hold temporarily those portions of the contents of main memory which it is believed will be used in the near future by a processor. The main purpose of a cache memory is to shorten the time necessary to perform memory accesses, either for data or instruction fetch. The information located in cache memory may be accessed in much less time than information located in main memory. Thus, a processor with a cache memory needs to spend far less time waiting for instructions and operands to be fetched and/or stored.

A cache memory is made up of many cache lines of one or more words of data. Each cache line has associated with it an address tag that uniquely identifies of which memory line of main memory the cache line is a copy. Each time the processor makes a memory reference, an address tag comparison is made to see if a copy of the requested data resides in the cache memory. If the desired memory line is not in the cache memory, the memory line is retrieved from the main memory, stored in the cache memory as a cache line and supplied to the processor.

In addition to using a cache memory to retrieve data from main memory, the processor may also write data into the cache memory instead of directly to the main memory. When the processor desires to write data to the memory, the cache memory makes an address tag comparison to see if the cache line into which data is to be written resides in the cache memory. If the cache line exists in the cache memory and is modified (dirty) or exclusive, the data is written into the cache line in the cache memory. In many systems a data "dirty bit" for the cache line is then set. The dirty bit indicates that data in the cache line is dirty (i.e., has been modified), and thus before the cache line is deleted from the cache memory the modified data must be written into main memory. If the cache line into which data is to be written does not exist in the cache memory, the cache/memory line must be fetched as exclusive into the cache memory or the data written directly into the main memory.

A shared-memory MP system has a potentially large number of processors, each with its own cache(s). When an access to memory is made in such a system, it is necessary to take steps to insure the integrity of data accessed. For example, when an entity reads data from memory, it is important to determine whether an updated version of the data resides in the cache of a processor on the system. If an updated version of the data exists, something must be done to insure that the entity accesses the updated version of the data. A mechanism that assures that the updated version of the data is utilized in a memory reference is referred to herein as a coherence mechanism.

The most common coherency mechanism is snooping, which, usually, requires the processors to share a bus. However, due to electrical reasons, only a limited number of processors can share a bus. Therefore, when the number of processors in an MP system is large, snooping can no longer be efficiently used for cache coherency.

The most common cache coherency mechanism for systems with a large number of processors is a directory structure in memory. Within the directory structure, line state information exists for each memory line within the memory. The line state information consists of a number of bits for each memory line. The bits for each memory line indicate, for that memory line, the state of the memory line (Private, Shared etc.), plus extra information relevant for that memory line state. When the memory line is held "Private" in a cache of a first processor, this means that the memory line is not available for use by other processors until released by the first processor, and that first processor is allowed to modify the contents of that memory line. When the memory line is held "Shared" in a cache of a first processor, this means that the memory line is available for use by other processors as long as the other processors do not want to hold the memory line as "Private", and while the line is held "Shared" the contents of the line are not allowed to be modified.

When a processor desires to access a memory line, a request is sent to a memory controller for the memory line. The memory controller reads line state information for the memory line to determine the current state of the requested memory line. If the line state information bits for the requested memory line indicate that the memory line is held Private in another cache, the memory line is recalled to the memory controller. When the memory line comes back to the memory controller, the memory controller supplies the memory line to the requester, updates the memory line's line state information and, if necessary, updates the data for the memory line in memory. If the memory line is requested as "Private" and the memory controller reads the line state information and finds the memory line is "Shared", the memory controller invalidates copies of the memory line in other caches (as indicated by the line state information) and then supplies the memory line to the requester. The memory controller also tags the memory line's line state information as "Private" and indicates the processor which now possesses the memory line.

The memory line recall/invalidate can take significant time to return/invalidate data. Meanwhile, new requests for the same memory line can be received by the memory controller. Retrying these new requests is messy in a large system because of the need to provide fairness and prevent starvation. Instead the new requests for that memory line could be queued as a linked list for that memory line in the memory controller. Once the recalled data or invalidate acknowledge is received, the memory controller services the requests for that memory line in the linked list in the order the requests were received. Multiple linked lists, one per recalled memory line, can exist at any time in the memory controller.

Generally linked lists are implemented using random access memory (RAM) structures. For the cache coherency mechanism described above, when a request for a memory line cannot be immediately satisfied, in response to a new request for the memory line, the memory controller after searching the directory for the memory line and discovering the memory line is unavailable, queues up the new request in a linked-list for the memory line. This generally includes creating a new entry for the new request, locating the end of the linked list and updating a next-entry pointer in the last entry in the linked list to point to the new entry. The new entry is then newly designated as the tail (last) of the linked list.

When the memory line becomes available, the memory controller will access the linked list for the first (head) entry and take the proper action. The pointers in the linked list will be updated to reflect the removal of the first entry in the linked list.

As is clear from the above description, every request will result in the memory controller accessing the directory for the memory line one or more times. A linked-list entry could also be created. If a line recall or invalidate is issued on behalf of the request, when the memory line is returned/invalidated, the memory controller again needs to search the linked list associated with the directory in order to complete the request. As a result, the search for the next entry must be efficient. Otherwise this can result in significant performance loss in many applications.

SUMMARY OF THE INVENTION

In accordance with the preferred embodiment of the present invention, a linked list structure in a computing system includes a first entry and additional entries. Each additional entry includes a link reference to a prior entry in the linked list. The link reference for each additional entry all are stored within a content addressable memory. For example, the link reference to the prior entry is the index of the prior entry within the content addressable memory. Each additional entry is accessible by performing a content search using the link reference to the prior entry within the next additional entry. That is, when the link reference to the prior entry is a link field which contains the index of the prior entry within the content addressable memory, the next additional entry is found by performing an associative search in the content addressable memory for an index of the entry in the linked list immediately prior to the next additional entry.

Thus, the linked list is traversed, for example, by accessing the first entry in the linked list. A second entry in the linked list is accessed by searching the content addressable memory for a reference to the first entry (e.g., using the index of the first entry within the content addressable memory). A third entry in the linked list is accessed by searching the content addressable memory for a reference to the second entry (e.g., using the index of the second entry within the content addressable memory). And so on.

In various embodiments of the present invention, the content addressable memory also stores for each entry a validity bit which indicates whether the entry is valid.

Various embodiments of the present invention may be tailored for particular applications. For example, in one embodiment, the linked list is used within a request queue in a memory controller used to access memory lines in a main memory. In a single queue embodiment, there is stored in the content addressable memory for the first entry and for each of the additional entries, a head field, a tail field, an address field, and a validity bit. The head field contains a value which is true for the first entry and which is false for each of the additional entries. The tail field contains a value which is true only for a last entry in the linked list. The address field contains an address for a memory line in the main memory. The validity bit indicates whether an entry is valid (in use). Additional information for each entry is stored in a random access memory addressed using the "match" bits from the corresponding CAM entry or from a normal index decoder. For example, the additional information includes an operation to be performed on the memory line. The additional information additionally may include a data field which, when valid, stores current data for the memory line.

In another embodiment of the present invention, the linked list is used within a two queue implementation of a request queue in a memory controller used to access memory lines in a main memory. In the two queue embodiment, for example, an address field and a validity bit for the first entry for each linked list are stored in a separate (head queue) content addressable memory. The head queue content addressable memory contains only the head entries of eventual linked-lists for memory lines. The address field contains an address for a memory line. The validity bit indicates whether the entry is valid. Additional information for the entry is stored in a random access memory.

Additional information for the first entry is stored in a random access memory. The additional information includes, for example, an operation to be performed on a memory line, a last field and a tail field. The last field contains a value which is true when the first entry is a last entry in the linked list. The tail field, when valid, contains an index for the last entry in the linked list. The additional information additionally may include a data field which, when valid, stores current data for the memory line.

There is stored in a second content addressable memory, for each of the additional entries, a head/link field. The head/link field contains a value which indicates whether the prior entry referenced by the link reference resides in the content addressable memory or in the second content addressable memory. Also entries in the second content addressable memory can contain a valid field and a link field.

The present invention allows for effective ways to implement a linked list which can significantly simplify access to the linked list for certain applications.

DESCRIPTION OF THE PREFERRED EMBODIMENTS

Figure 1:
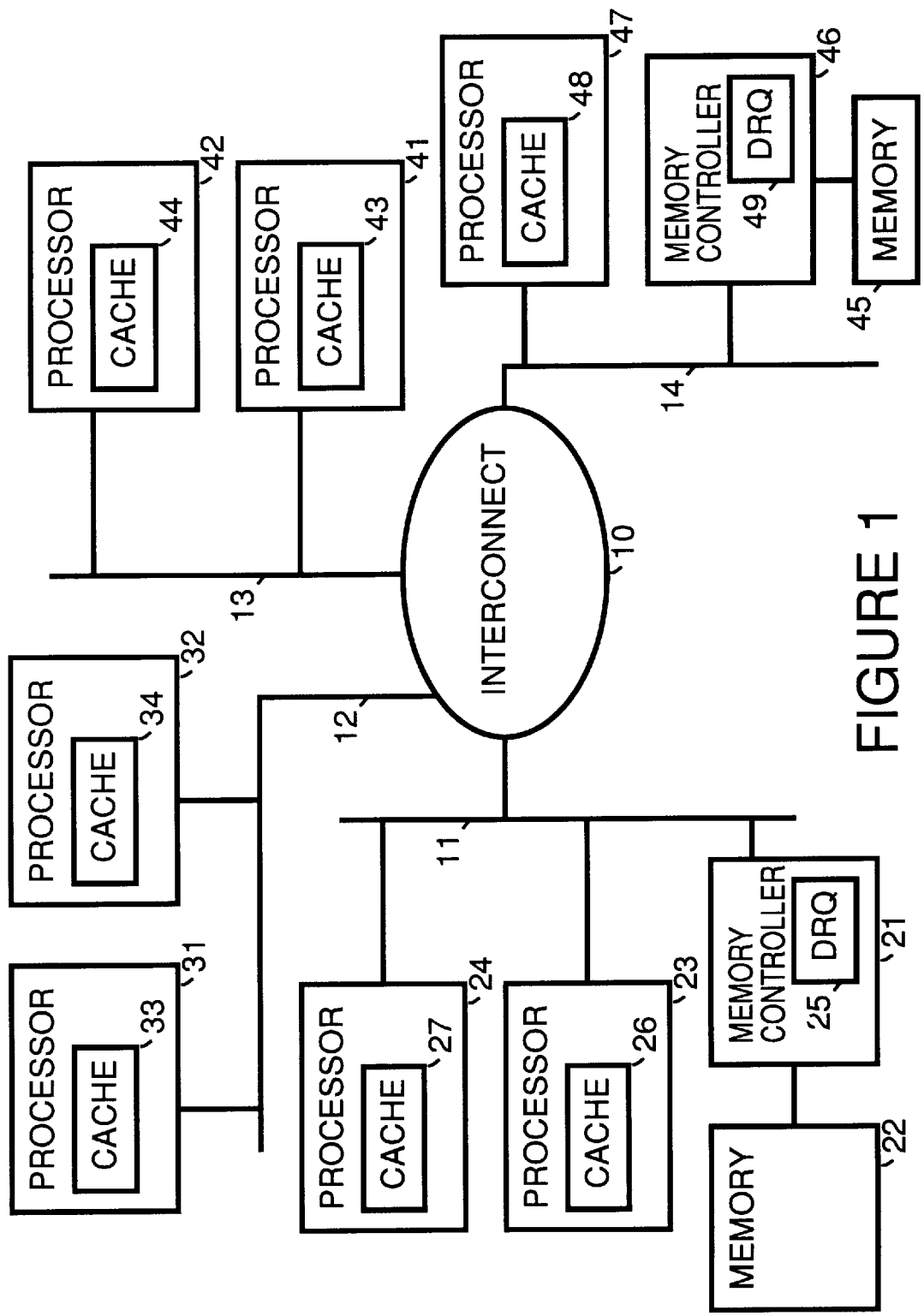
FIG. 1 shows interconnection of various entities in a computing system in accordance with a preferred embodiment of the present invention.

FIG. 1 illustrates various entities being interconnected within a computing system. For example connected to a bus 11 is a processor 24, a processor 23 and a memory controller 21. Processor 24 includes a cache 27. Processor 23 includes a cache 26. Memory controller 21 includes a deferred read queue (DRQ) 25. Memory controller 21 controls access to a memory 22. Other entities may also be connected to bus 11.

Connected to a bus 12 is a processor 31 and a processor 32. Processor 31 includes a cache 33. Processor 32 includes a cache 34. Other entities may also be connected to bus 12. Connected to a bus 13 is a processor 41 and a processor 42. Processor 41 includes a cache 43. Processor 42 includes a cache 44. Other entities may also be connected to bus 13. Connected to a bus 14 is a processor 47 a memory controller 46. Processor 47 includes a cache 48. Memory controller 46 controls access to a memory 45. Memory controller 46 includes a deferred read queue (DRQ) 49. Other entities may also be connected to bus 14.

Busses 11, 12, 13 and 14 are interconnected in some manner, as illustrated by an interconnect 10. Other busses may additionally be interconnected by interconnect 10. In this sense, FIG. 1 is merely illustrative of any combination of entities interconnected within a computing system.

When an access to memory 22 is made in such a system, memory controller 21 insures the integrity of data accessed. For example, when an entity reads data from memory 22, memory controller 21 determines whether an updated version of the data resides in a cache of one of the processors within the computing system. If an updated version of the data exists, memory controller 21 utilizes a cache coherency mechanism to insure data integrity.

Within a directory structure within memory 22, line state information exists for each memory line within the memory 22. The line state information consists of a number of bits for each memory line. The bits for each memory line indicate, for the memory line, the state of the memory line (Private, Shared etc.), plus extra information relevant for that memory line state. When the memory line is held "Private" in a cache of a first processor, this means that the memory line is not available for use by other processors until released by the first processor, and that first processor is allowed to modify the contents of that memory line. When the memory line is held "Shared" in a cache of a first processor, this means that the memory line is available for use by other processors as long as the other processors do not want to hold the memory line as "Private", and while the line is held "Shared" the contents of the line are not allowed to be modified.

When a processor desires to access a memory line from memory 22, a request is sent to a memory controller 21 for the memory line. Memory controller 21 reads line state information for the memory line to determine the current state of the requested memory line. If the line state information bits for the requested memory line indicate that the memory line is held "Private" in another cache, memory controller 21 issues a recall for the memory line. When the memory line is returned to memory controller 21, memory controller 21 supplies the memory line to the requester, updates the memory line's line state information and, if necessary, updates the data for the memory line in memory 22.

Figure 2:
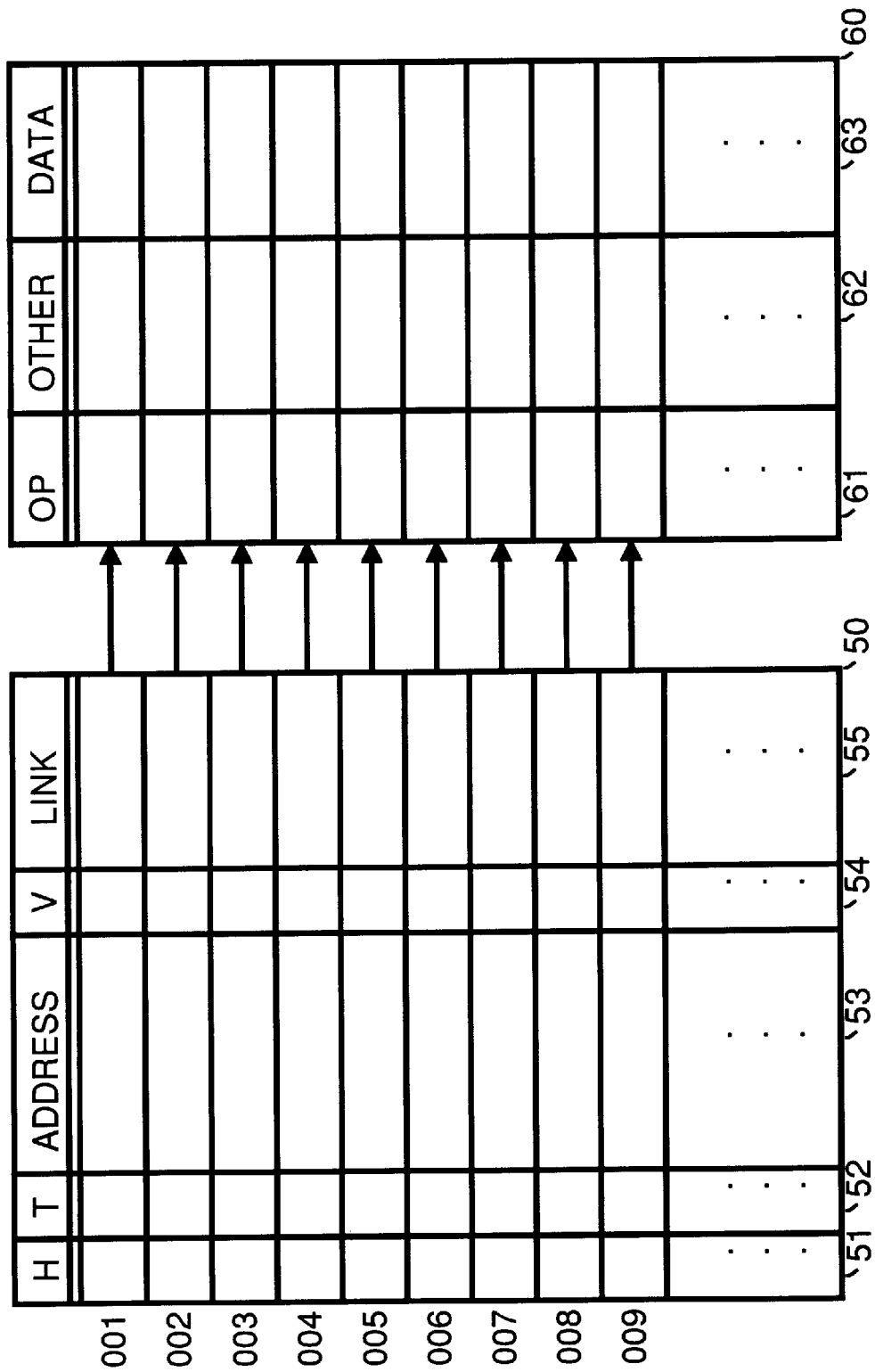
FIG. 2 shows a deferred read queue used in a memory controller to hold memory line requests which cannot be immediately satisfied in accordance with a preferred embodiment of the present invention.

When memory controller 21 invalidates or requests a recall of a memory line and memory controller 21 receives additional requests for the memory line while waiting for response to the recall or invalidation, memory controller queues the additional requests as a linked list for that memory line in a deferred read queue (DRQ) shown in FIG. 2. All the DRQ entries in the DRQ contain requests for memory lines which are in the process of being recalled, invalidated or read from memory, as well as requests queued in linked lists which wait for these previous requests for the same memory line to finish.

The deferred read queue shown in FIG. 2 includes a content addressable memory (CAM) 50 and a random access memory (RAM) 60. The implementation of a DRQ shown in FIG. 2 uses a single fully-associative structure for both the head and tail information and for the linked-list implementation.

Each DRQ entry in the DRQ is divided into various fields. Within CAM 50, an address field 53 is used to store an address which indicates a memory line within memory 22 for which the DRQ entry pertains. A head (H) field 51 stores a bit indicating when the DRQ entry contains the first entry of a linked list for the address stored in address field 53. A tail (T) field 52 stores a bit which indicates when the DRQ entry contains the last entry of a linked list for the address stored in address field 53. A valid (V) field 54 includes a bit which indicates when the DRQ entry contains a valid request. A link field 55 contains the DRQ index of the preceding entry in the linked list, if any, for the memory line. The number of bits for the link field depends upon the size of the DRQ. In FIG. 2 only nine DRQ entries (indexed from 001 to 009) are shown. The number of DRQ entries can differ significantly depending upon the configuration of the computing system, the size of memory 22 and many other different factors.

Within RAM 60, an operation (OP) field 61 indicates an encoding of the request stored in the DRQ entry. An other field 62 contains other information necessary to complete the request stored in the DRQ entry. An optional data field 63 can be used to store data returned by the memory read for the request stored in the DRQ entry. Caching the memory line's data can significantly improve the latency in the case when a line recall does not return data, because the memory line was not modified by its previous owner.

When searching CAM 50, the searched fields can be limited by forcing other fields in CAM 50 to be "don't care" when utilizing the comparator mechanism for CAM 50. For example, when checking if a request for a first memory line is in the DRQ, a search can be performed using tail field 52, address field 53 and valid field 54. To search tail field 52, a comparison is made between the value "Logic 1" and the contents of tail field 52 for each DRQ entry in CAM 50. To search address field 53, a comparison is made between the address of the first memory line and the contents of address field 53 for each DRQ entry in CAM 50. To search valid field 54, a comparison is made between the value "Logic 1" and the contents of valid field 54 for each DRQ entry in CAM 50. Such a search using tail field 52, address field 53 and valid field 54 is done when a new request is received and has to be queued in the DRQ. If no match is found, a new linked list is started for the first memory line. The first entry for the new linked list will contain information describing the request. If—after a search using tail field 52, address field 53 and valid field 54 is performed when a new request is received and has to be queued in the DRQ—a match is found, a new DRQ entry for the request is linked to the end of the existing linked list.

FIGS. 3 through 9 below illustrate use of the DRQ shown in FIG. 2 to store and utilize the requests listed in Table 1 below:

TABLE 1

| Request 1 | Read Private | Memory line A |
| Request 2 | Read Shared | Memory line A |
| Request 3 | Read Shared | Memory line A |
| Request 4 | Read Shared | Memory line A |

Figure 3:
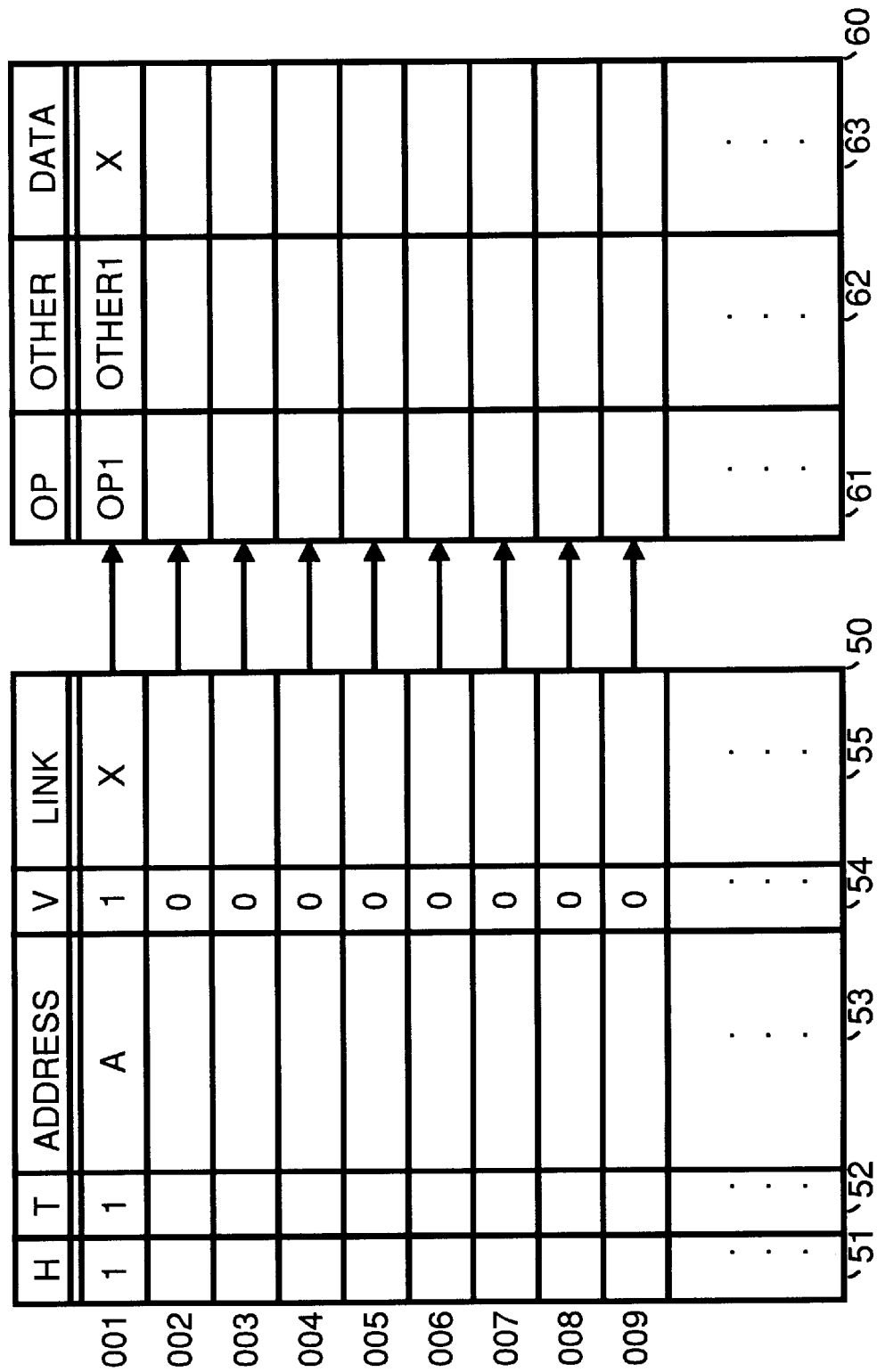
FIGS. 3, 4, 5, 6, 7, 8, 9 and 10 show contents within the deferred read queue shown in FIG. 2 in order to illustrate use of the deferred read queue to hold memory line requests which cannot be immediately satisfied in accordance with a preferred embodiment of the present invention.

When memory controller 21 receives Request 1, memory controller 21 searches CAM 50 using tail field 52, address field 53 and valid field 54, as described above, for a valid entry for memory line A. If there is no DRQ match, memory controller 21 reads the directory in memory 22 and finds, for example, the memory line A held "Private" by a cache in one of the processors in the computing system. As a result, memory controller issues a recall of memory line A to the owner cache. Memory controller 21 also finds a free DRQ entry within the DRQ and places in the free DRQ entry information for Request 1, as illustrated by FIG. 3. In some embodiments of the present invention, memory controller 21 also may queue the request in the DRQ while going to memory.

In FIG. 3, the DRQ for Request 1 is in the DRQ entry with the index 001. The value of "1" in head field 51 and tail field 52 indicates that this is both the head and the tail of the linked list for memory line A. When head field 51 contains a value of "1", the contents of link field 55 are usually ignored. The V bit is set to "1" (true), to indicate a valid DRQ entry. Operation field 61 and other field 62 contain pertinent information for Request 1. After the DRQ entry for Request 1 is filled in, a head pointer for the DRQ is incremented to point to a next free DRQ entry. While in the present embodiment, the head pointer for the DRQ is incremented to point to a next free DRQ entry, in alternate embodiments of the present invention, different mechanisms may be used to manage the free DRQ entries.

Figure 4:
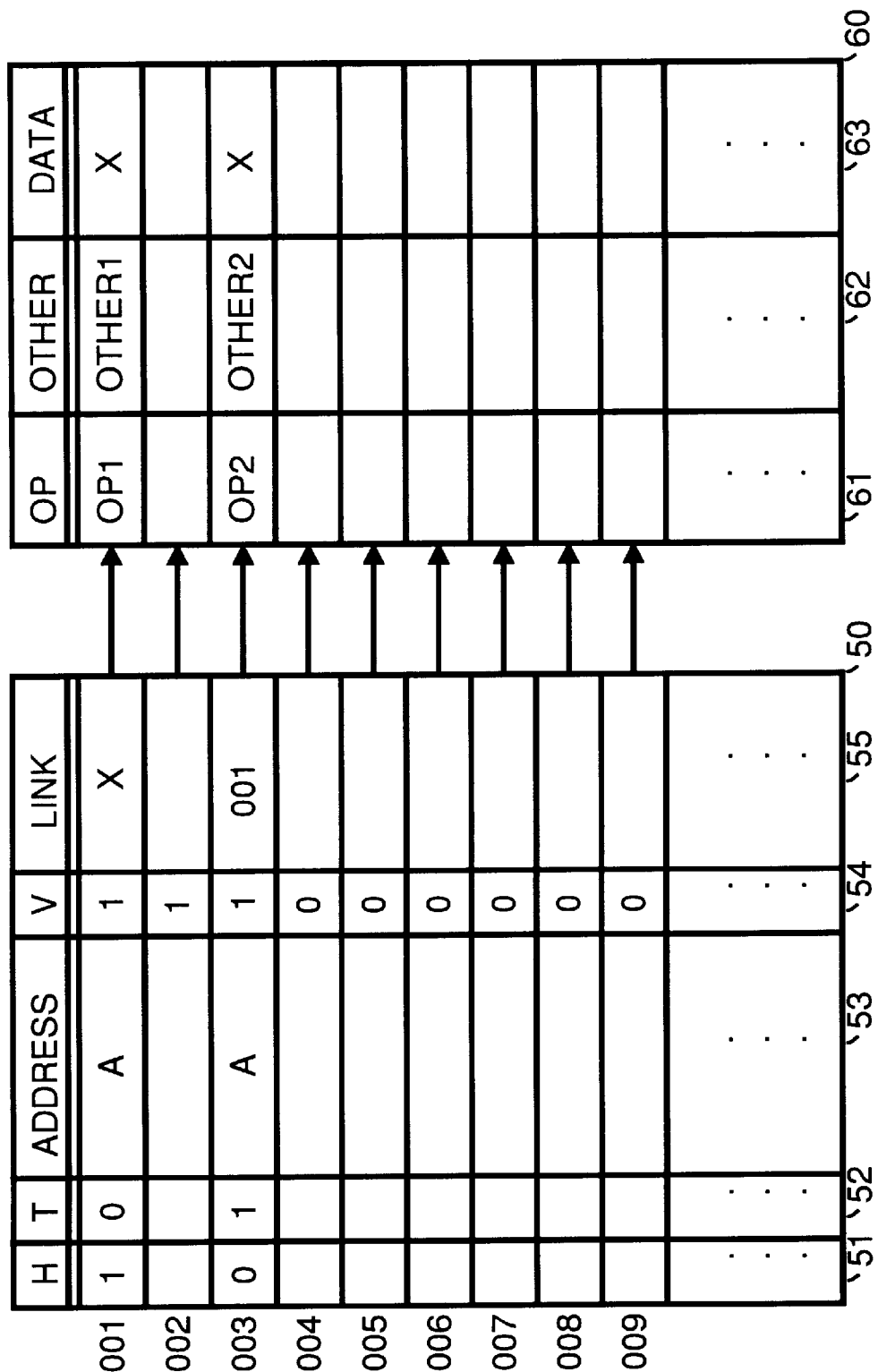

In the given example, while waiting for the recall for memory line A, memory controller 21 receives Request 2 for memory line A. Memory controller 21 searches CAM 50 using address field 53, valid field 54 and tail field 52, for a valid entry for memory line A which is at the end of a linked list. Memory controller 21 will find DRQ entry 001. Memory controller 21 will change the entry in DRQ entry 001 so that tail field 52 for DRQ entry 001 is equal to "0". As only one bit is involved, this can be done as a byproduct of the CAM match, using a special CAM cell (thus no separate CAM access is needed for this). Memory controller 21 also finds a free DRQ entry within the DRQ and places in the free DRQ entry information for Request 2, as illustrated by FIG. 4. FIG. 4 presupposes that DRQ entry 002 was used to store another request for another memory line which arrived after Request 1 and before Request 2.

In FIG. 4, the DRQ for Request 2 is in the DRQ entry with the index 003. The value of "1" in tail field 52 indicates that this is the tail of the linked list for memory line A. In link field 55 for DRQ entry 003, memory controller 21 places the index 001 which is the DRQ index of the preceding entry for memory line A (the previous tail of the linked list). The V bit is set to "1" (true), to indicate a valid DRQ entry. Operation field 61 and other field 62 contain pertinent information for Request 2. After the DRQ entry for Request 2 is filled in, the head pointer for the DRQ is incremented to point to a next free DRQ entry. Additionally, other structures can be used to determine the next free DRQ entry.

Figure 5:
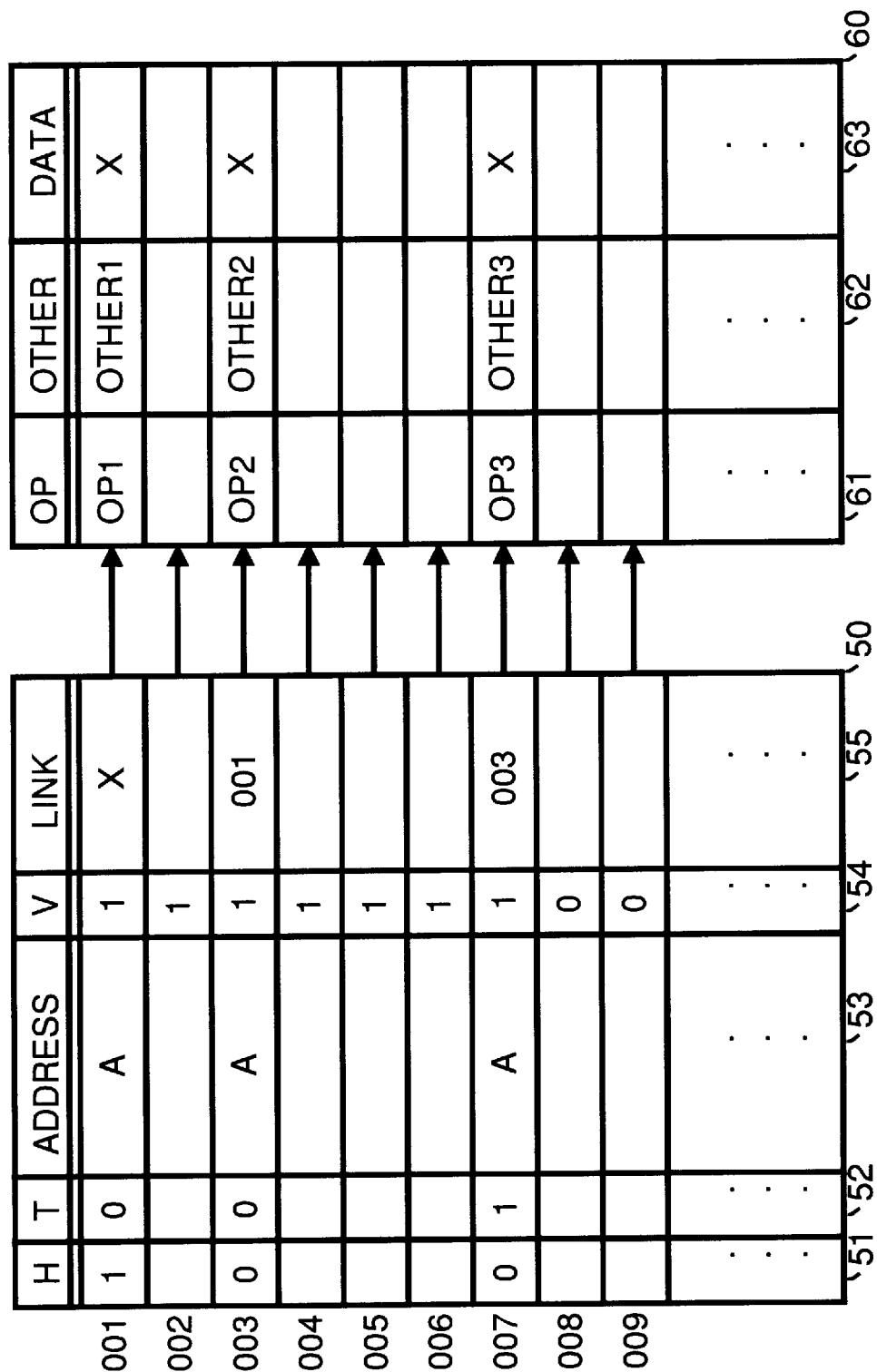

While still waiting for the recall for memory line A, memory controller 21 receives Request 3. Memory controller 21 searches CAM 50 using address field 53, valid field 54 and tail field 52, for a valid entry for memory line A which is at the end of a linked list. Memory controller 21 will find DRQ entry 003. Memory controller 21 will change the entry in DRQ entry 003 so that tail field 52 for DRQ entry 003 is equal to "0". Memory controller 21 also finds a free DRQ entry within the DRQ and places in the free DRQ entry information for Request 3, as illustrated by FIG. 5. FIG. 5 presupposes that DRQ entries 004, 005 and 006 were used to store other requests, for other memory lines, which arrived after Request 2 and before Request 3.

In FIG. 5, the DRQ for Request 3 is in the DRQ entry with the index 007. The value of "1" in tail field 52 indicates that this is the tail of the linked list for memory line A. In link field 55 for DRQ entry 007, memory controller 21 places the index 003 which is the DRQ index of the preceding entry for memory line A. The V bit is set to "1" (true), to indicate a valid DRQ entry. Operation field 61 and other field 62 contain pertinent information for Request 3. After the DRQ entry for Request 3 is filled in, the head pointer for the DRQ is incremented to point to a next free DRQ entry.

Figure 6:
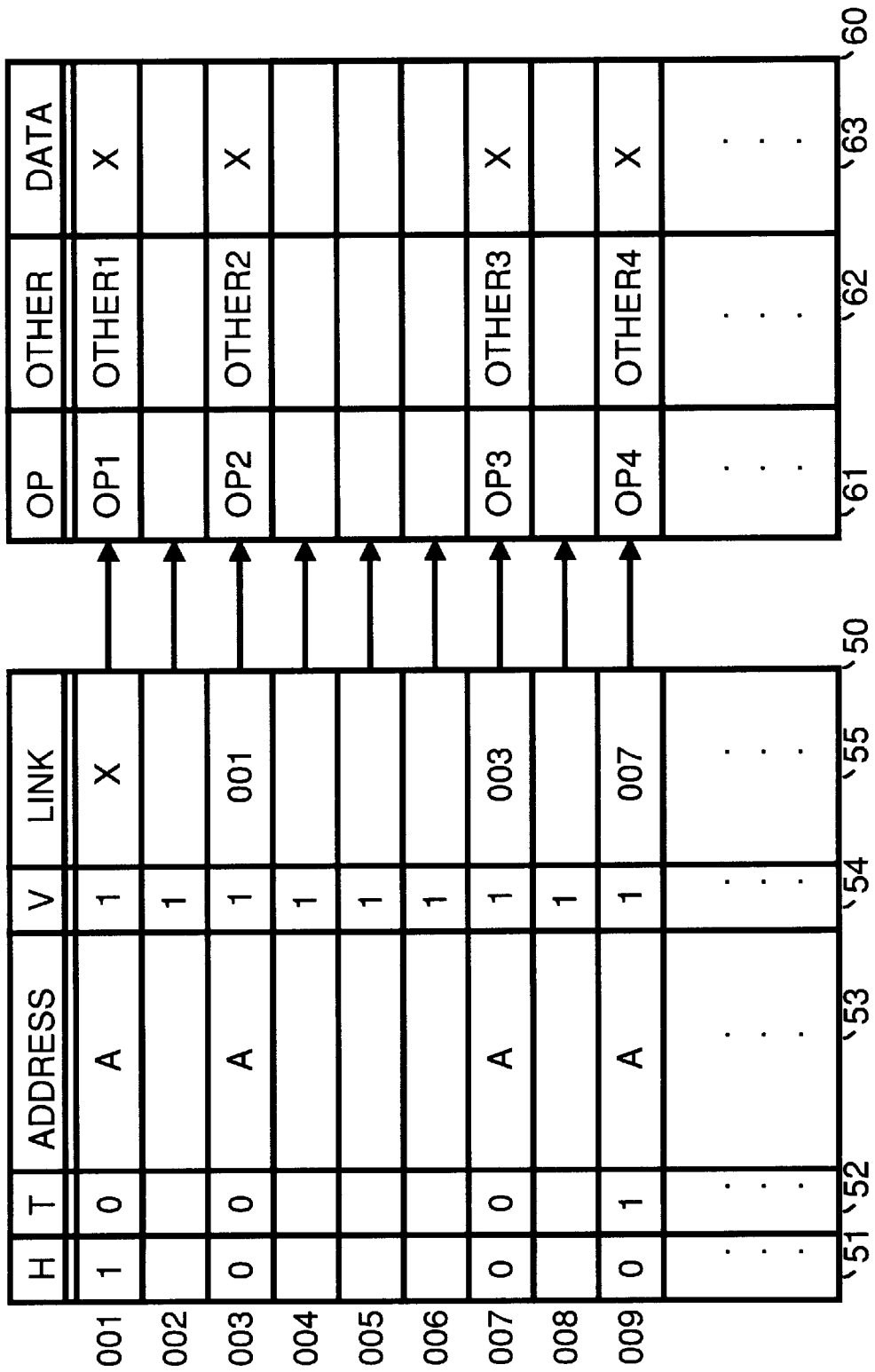

Also, while still waiting for the recall for memory line A, memory controller 21 receives Request 4. Memory controller 21 searches CAM 50 using address field 53, valid field 54 and tail field 52, for a valid entry for memory line A which is at the end of a linked list. Memory controller 21 will find DRQ entry 007. Memory controller 21 will change the entry in DRQ entry 007 so that tail field 52 for DRQ entry 007 is equal to "0". Memory controller 21 also finds a free DRQ entry within the DRQ and places in the free DRQ entry information for Request 4, as illustrated by FIG. 6. FIG. 6 presupposes that DRQ entry 008 was used to store another request, for another memory line, which arrived after Request 3 and before Request 4.

In FIG. 6, the DRQ for Request 4 is in the DRQ entry with the index 009. The value of "1" in tail field 52 indicates that this is the tail of the linked list for memory line A. In link field 55 for DRQ entry 009, memory controller 21 places the index 007 which is the DRQ index of the preceding entry for memory line A. The V bit is set to "1" (true), to indicate a valid DRQ entry. Operation field 61 and other field 62 contain pertinent information for Request 4. After the DRQ entry for Request 4 is filled in, the head pointer for the DRQ is incremented to point to a next free DRQ entry.

When memory controller receives a response from the owner of memory line A, including any updated data for memory line A, memory controller 21 searches CAM 50 using address field 53 set to address A, head field 51 equal to 1 (true), and valid field 54 equal to 1 (true). The other fields for the search are "don't care". DRQ entry 001 will match in this case and its contents will be read.

Memory controller 21, having found DRQ entry 001, will then use the information in operation field 61 and other field 62 to perform Request 1. Memory controller 21 will also update the DRQ to indicate that Request 1 has been performed.

Figure 7:
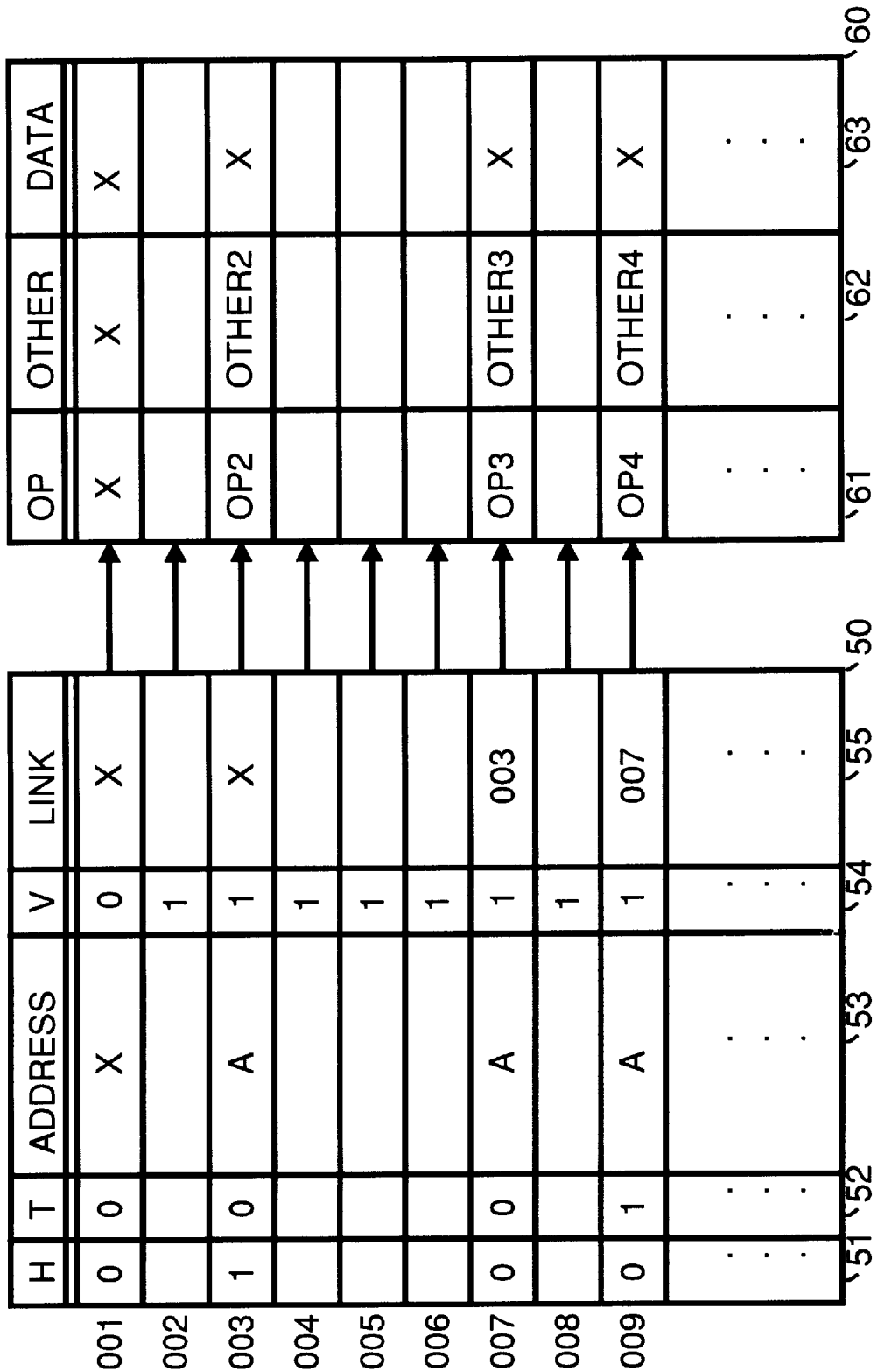

Specifically, as shown in FIG. 7, memory controller 21 will invalidate DRQ entry 001 and will also make DRQ entry 001 eligible for reuse. Since for DRQ entry 001, tail field 52 equals "0" (i.e., is not true, indicating that there are more requests queued for memory line A), DRQ will search for the next link in the chain using the index of this entry (001). Memory controller 21 searches CAM 50 using link field 55 (set to 001) and valid field 54 (set to 1) for the next entry in the linked list. Memory controller 21 will find DRQ entry 003. Memory controller 21 will read operation field 61 and other field 62 to determine the type of request. For the current example, memory controller 21 will discover that Request 2 is for a read "Shared". As line A was given as Private as a result of Request 1, Request 2 cannot be performed until after a recall of memory line A. Therefore, memory controller will issue a new recall of memory line A to the new owner of memory line A. Memory controller 21 will also change the entry in DRQ entry 003 so that head field 51 for DRQ entry 003 is equal to "1" and the address field 53 has the address A. Link field 55 of DRQ entry 003 is "don't care" because DRQ entry 003 is now head of the linked list for memory line A. The result is shown in FIG. 7.

For optimized performance, any updated data for memory line A can be stored in data field 63 of DRQ entry 003. Alternately, the updated data for memory line A can be captured in a local buffer within memory controller 21, and/or returned to memory 22. The sole purpose of caching the data in the DRQ is to avoid going again to memory 22 in the cases when the new owner of memory line A either casts-out memory line A before it is recalled or does not modify memory line A while in its cache.

When memory controller receives a response from the new owner of memory line A, including any updated data for memory line A, memory controller 21 again searches CAM 50 using address field 53 set to address A, head field 51 equal to 1 (true), and valid field 54 equal to1 (true). The other fields for the search are "don't care". DRQ entry 003 will match in this case and its contents will be read.

Memory controller 21, having found DRQ entry 003, will then use the information in operation field 61 and other field 62 to perform Request 2. Memory controller 21 will also update the DRQ to indicate that Request 2 has been performed.

Figure 8:
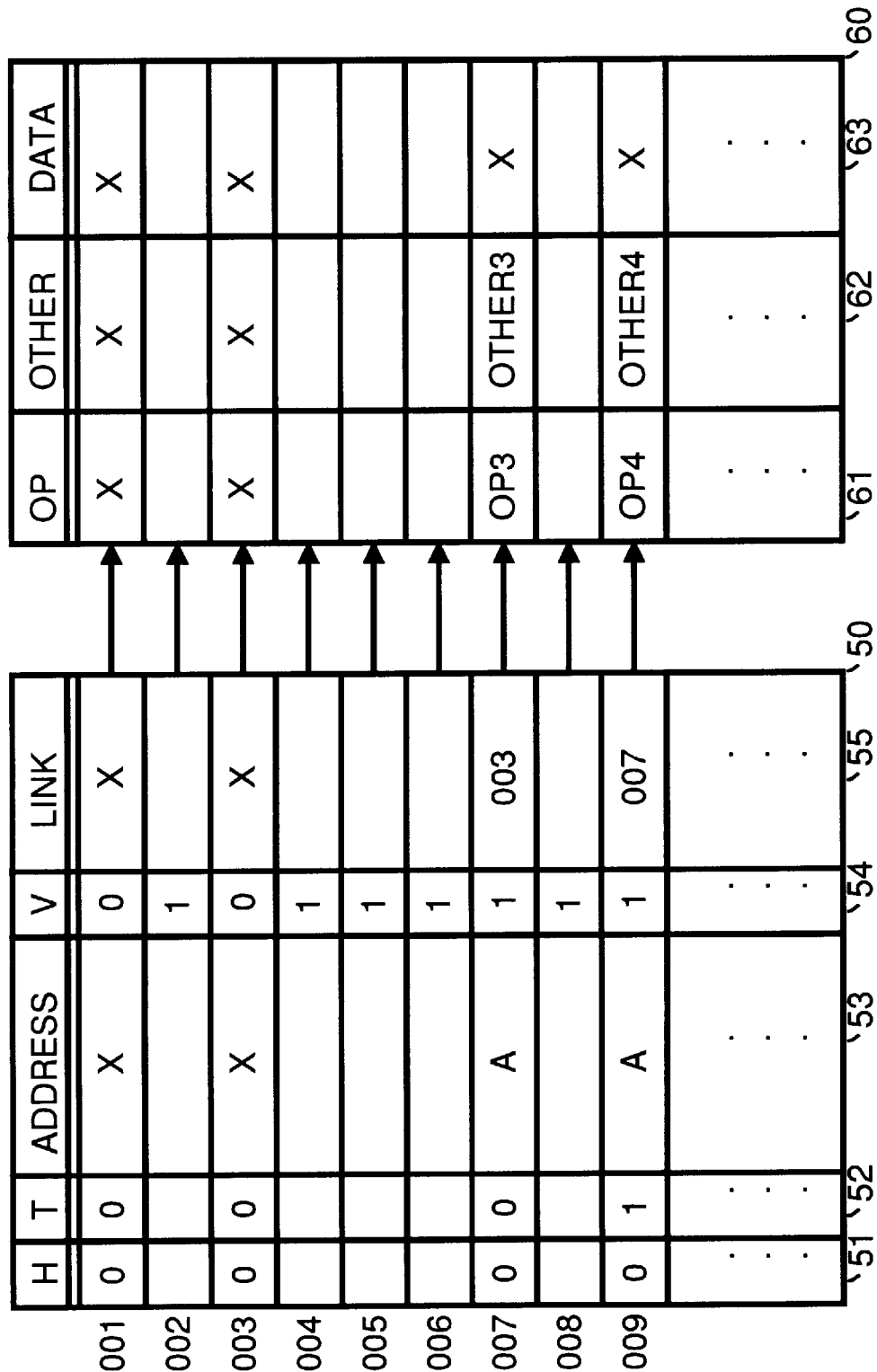

Specifically, as shown in FIG. 8, memory controller 21 will invalidate DRQ entry 003 and make DRQ entry 003 eligible for reuse. Since for DRQ entry 003, tail field 52 equals "0" (i.e., is not true), DRQ will search for the next link in the chain. Memory controller 21 searches CAM 50 using link field 55 (set to 003) and valid field 54 (set to 1) for the next entry in the linked list. Memory controller 21 will find DRQ entry 007. Since no recall of memory line A is needed to perform Request 3, there is no need for memory controller 21 to set head field 51 of DRQ entry 007 to "1" (true). Instead, head field 51 of DRQ entry 007 is left unchanged. The result is shown in FIG. 8.

Memory controller 21 will read operation field 61 and other field 62 to determine the type of request. For the current example, memory controller 21 will discover that Request 3 is for a read "Shared" which can be performed without recalling memory line A. Therefore, memory controller will use the information in operation field 61 and other field 62 to perform Request 3. As Request 3 can be performed right away, memory controller 21 will update the DRQ to indicate that Request 3 has been performed.

Figure 9:
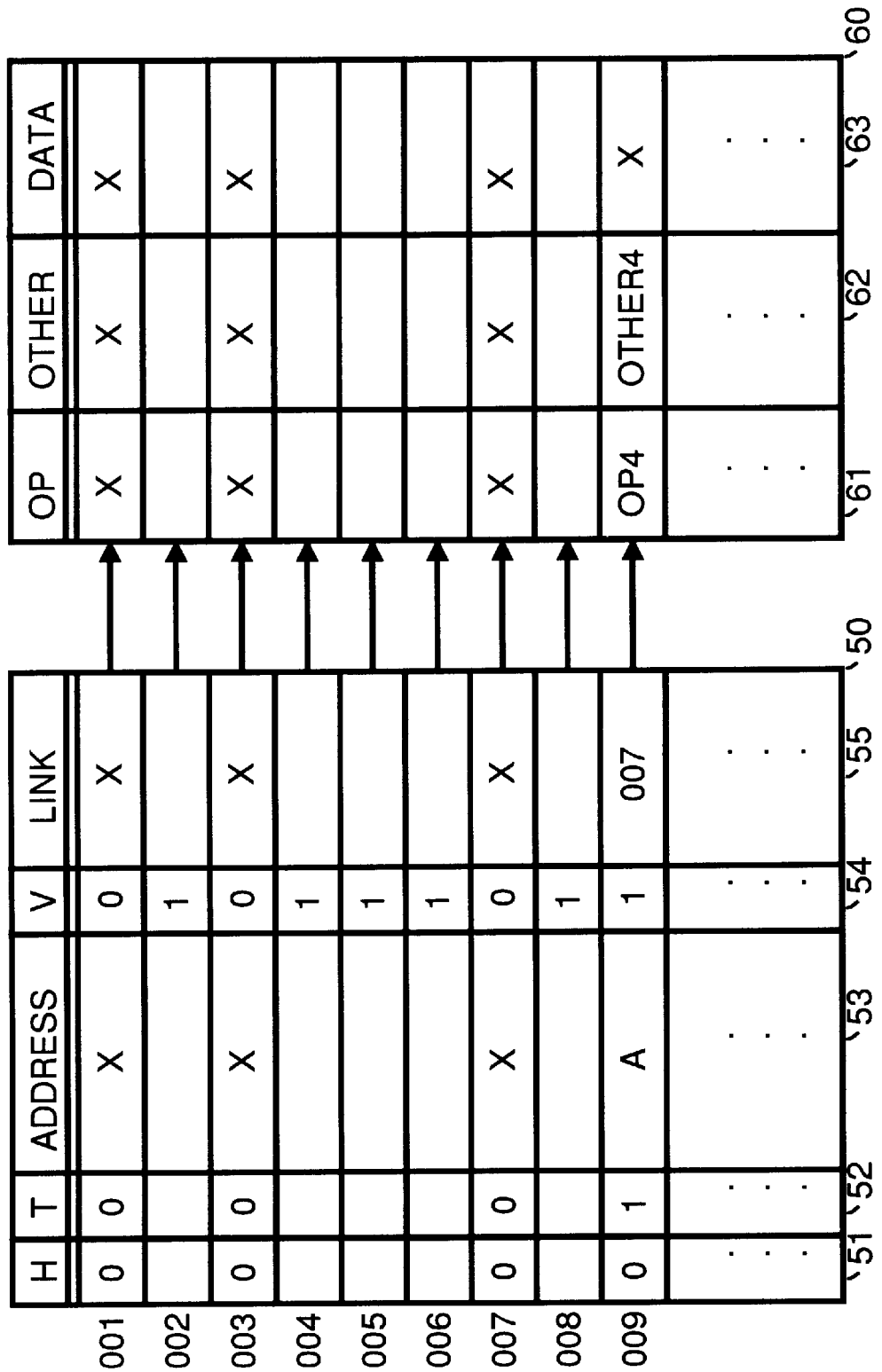

Specifically, as shown in FIG. 9, memory controller 21 will invalidate DRQ entry 007 and make DRQ entry 007 eligible for reuse. Since for DRQ entry 007, tail field 52 equals "0" (i.e., is not true), DRQ will search for the next link in the chain. Memory controller 21 searches CAM 50 using link field 55 (set to 007) and valid field 54 (set to 1) for the next entry in the linked list. Memory controller 21 will find DRQ entry 009.

Memory controller 21 will read operation field 61 and other field 62 to determine the type of request. For the current example, memory controller 21 will discover that Request 4 is for a read "Shared" which can be performed without recalling memory line A. As a result, memory controller 21 can leave head field 51 of DRQ entry 009 unchanged. The result is shown in FIG. 9.

Memory controller 21 will use the information in operation field 61 and other field 62 to perform Request 4. Memory controller 21 will also update the DRQ to indicate that Request 4 has been performed.

Figure 10:
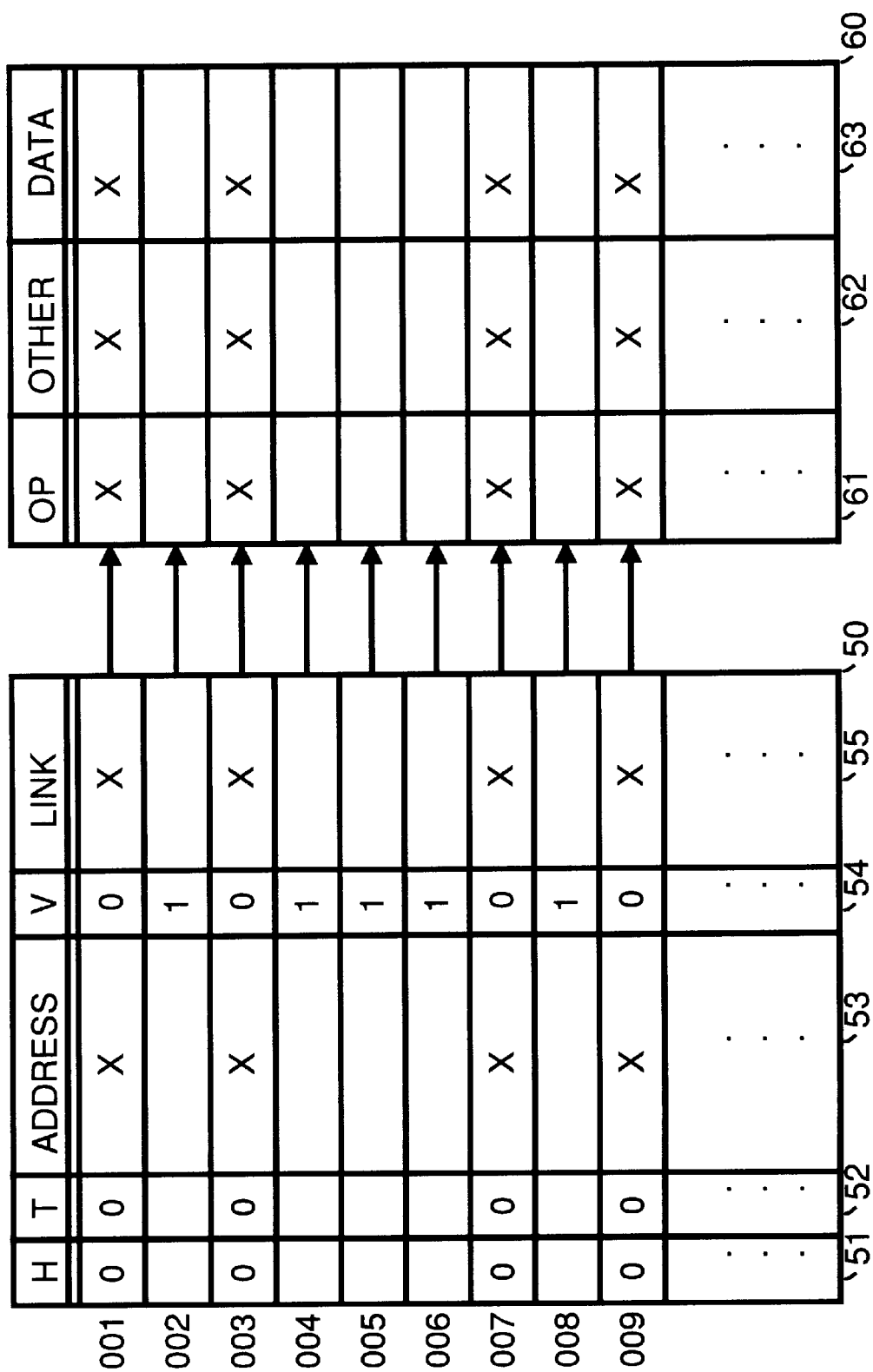

Specifically, as shown in FIG. 10, memory controller 21 will invalidate DRQ entry 009 and make DRQ entry 009 eligible for reuse. Since for DRQ entry 009, tail field 52 equals "1" (i.e., is true), DRQ will not search for a next link in the chain. Memory controller 21 will mark the line state information for memory line A within memory 22 as being "Shared".

Figure 11:
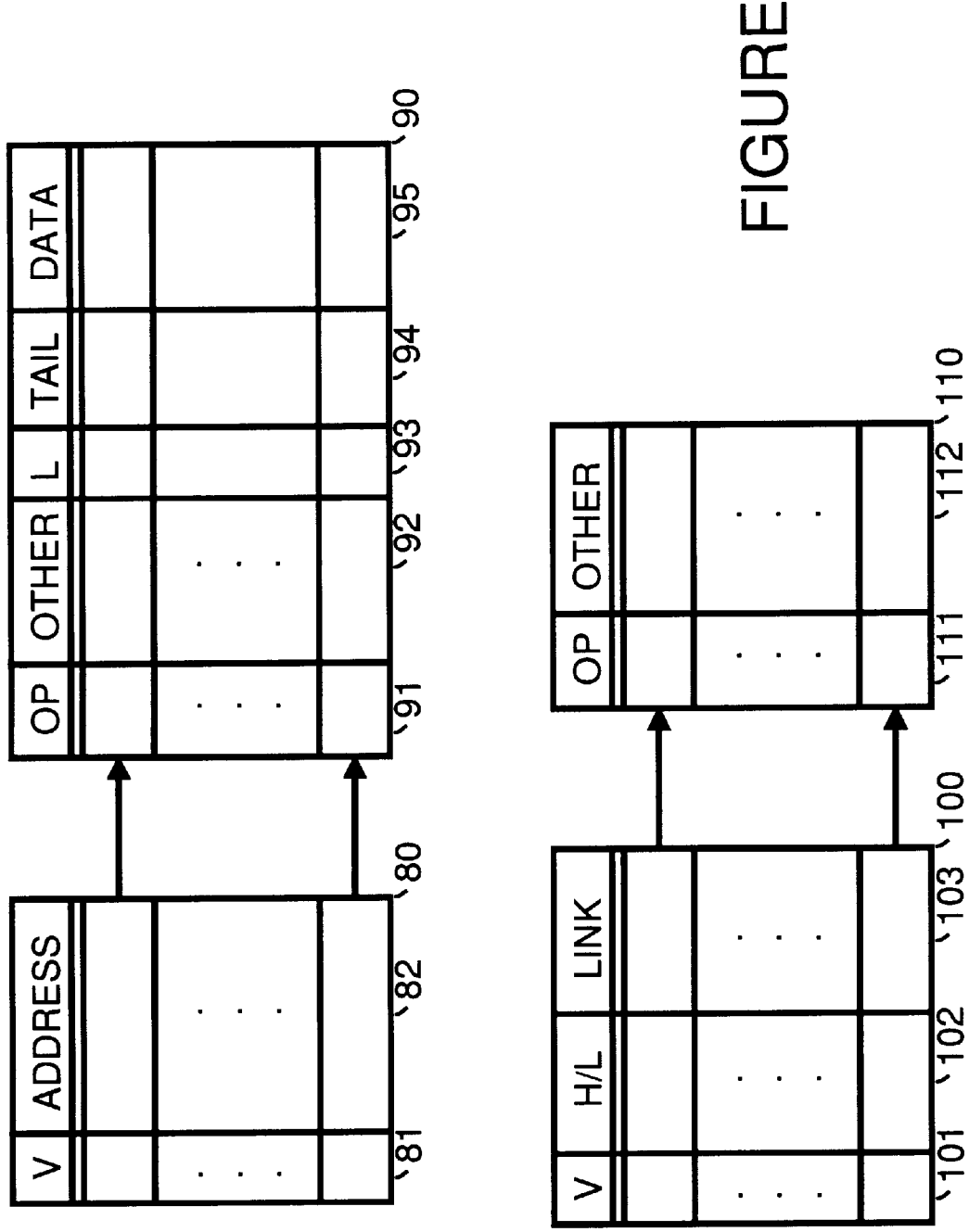
FIG. 11 shows a deferred read queue used in a memory controller to hold memory line requests which cannot be immediately satisfied, in accordance with an alternative preferred embodiment of the present invention.

FIG. 11 shows an alternative embodiment of the present invention, where the DRQ is implemented using two associative queues. This embodiment is preferable when, for performance reasons, one associative queue for the linked list implementation requires multiple ports. In this case the number of ports can usually be reduced by separating head entries of the list from the linked part of the list by using 2 associative queues.

The deferred read queue (DRQ) shown in FIG. 11 has two associative queues. The first queue includes a content addressable memory (CAM) 80 and a random access memory (RAM) 90. The second queue includes a CAM 100 and a RAM 110. All the DRQ entries in these two queues contain requests for memory lines which are in the process of being recalled or invalidated or in the process of being read from memory as well as requests queued in linked list behind requests for the same line. CAM 80 and RAM 90 form a head queue (HQ) where the head of each linked list is stored. CAM 100 and RAM 110 form a link queue (LQ) where additional entries in each linked list are stored.

Within CAM 80, an address field 82 is used to store an address which indicates a memory line within memory 22 for which the DRQ entry pertains. A valid (V) field 81 consists of a bit which indicates when the DRQ entry contains a valid request.

Within RAM 90, an operation (OP) field 61 indicates an encoding of the request stored in the DRQ entry. An other field 92 contains other information necessary to complete the request stored in the DRQ entry. A last (L) field 93 (equivalent with tail field 52 in the previous DRQ embodiment) stores a bit which indicates when the DRQ entry contains the last entry of a linked list for the address stored in address field 53. A tail field 94 indicates the index of the last item of the linked list for the entry.

An optional data field 95 can be used to store data for the memory line for the request stored in the DRQ entry. Data field 95, if implemented at all, is not needed for the LQ because the HQ is where the first entry of the linked list for a certain address, including the data read from memory, is stored. When traversing the link needs to be interrupted (for example because the memory line was given as "Private" to a processor and needs to be recalled), the request waiting for that data is copied to the HQ, including the data from the local data register (i.e. the register that, in order to speed up linked-list traversals, gets the data from the previous head entry that just completed or is about to complete).

Within CAM 100, a valid (V) field 101 consists of a bit which indicates when the DRQ entry contains a valid request. A link field 103 contains the DRQ index of the preceding entry for the memory line. The number of bits for the link field depends upon the size of the DRQ (the larger size between HQ and LQ). A head/link (H/L) field 102 is logically part of link field 103. When false (logic 0), H/L field 102 indicates that link field 102 represents a HQ index. When true H/L field 102 indicates that link field 102 represents an LQ index.

Within RAM 110, an operation (OP) field 111 indicates an encoding of the request stored in the DRQ entry. An other field 112 contains other information necessary to complete the request stored in the DRQ entry.

When an entry in the DRQ is created for a certain memory line and there was no match for the address of the memory line in the HQ, an entry is created for that address in the HQ at the next free entry in the HQ. This entry will have, in valid field 81, the V bit asserted and the address field will be the address of the memory line to be queued. RAM 90 will have the necessary information, in operation field 91 and other field 92, to complete the request when data becomes available. Additionally, the last bit in L field 93 will be asserted to indicate there is no linked list spilling into the LQ. The value in tail field 94 is a "Don't Care" because there is no link to other entries.

Upon receipt of another request for the same memory line, memory controller 22 will search the HQ using the address for the memory line and find the match previously placed in the HQ. As a result controller 22 will queue the new request in the LQ and link it to the current "Tail" entry. This is done by using the next free LQ entry. In link field 103 there is placed the index of the previous "Tail" entry. The value in V field 101 is asserted. As the L bit of the matching HQ entry is asserted, the value in H/L field 102 is written as unasserted (indicating that the link in link field 103 is an HQ index) and the index of the matching HQ entry is the value written in link field 103.

The HQ entry for the memory line also has to be updated. In RAM 90, the bit in L field 93 is unasserted to indicate that entries for the memory line spill into LQ. Additionally, the value in tail field 94 is updated to include the index of the last LQ entry for linked list for the memory line. In this case, it is the index of the LQ entry just written (what used to be the next free LQ entry.

Also, the RAM 110 is updated with all the information needed to complete the request when data becomes available. If yet another request for the same line is received and this time the bit in the L field 93 of the matching HQ entry is unasserted, this entry should be queued in the linked list as the last item, after the item currently at the Tail LQ index. This is done, in our example implementation, by writing in the next free LQ entry: Link=Tail, V asserted and H/L asserted (which means that Link is an LQ index). The matching HQ entry's RAM also has to be updated, with the bit in L field 93 still unasserted and with Tail=index of the last LQ entry for that address linked list, which in our case is the index of the LQ entry just written. That LQ entry's RAM part is updated in operation field 91 and other field 92 with all the information needed to complete the request when data becomes available.

The operation of the DRQ using the HQ and LQ associative queues is fairly similar to operation of the DRQ with only one associative queue, as described above. The only significant difference is the addition of the H/L bit and the fact that two queues are manipulated instead of one. Also, the mechanism used to detect the last item of the list is also somewhat different, as it uses tail field 94 and L field 93 located in RAM 90. Both single associative queue and double associative queue embodiments of DRQ, however, use the proposed mechanism of traversing the linked list through associative search using the current index as the link.

To de-queue an entry, for instance when a recall response is received, the HQ CAM 80 is searched using the returned address for the memory line. The DRQ entry with an address in address field 82 which matches the returned address is accessed. The information for the entry in operation field 91 and other field 92 is used to complete the request. This entry for the memory line is invalidated.

If the bit in L field 93 of the matching HQ entry is asserted, this indicates that there are no more entries in the linked list for that memory line. If, however, the bit in L field 93 is unasserted, this indicates that there are additional entries for the memory line in the LQ. The next entry in the linked list for the memory line is accessed by searching LQ CAM 100 with the matching HQ index for the memory line and with the bit corresponding to valid field 101 asserted and the bit corresponding to H/L field 102 unasserted. The bit in H/L field 102 is unasserted to indicate that the index used for the search of link field 103 is an HQ index.

The next steps in this example depend on the nature of the just completed request for the memory line in the HQ. If the previous request leaves the memory line "Shared" and the next request does not want the line as "Private", the next request could be executed immediately using local registers dedicated to speeding up link traversals. At this point, if the value in tail field 94 equals the index of the matching LQ entry, this is the end of the linked link traversal for the memory line. If the value in tail field 94 does not equal the index of the matching LQ entry, the next entry for the memory line in the linked list is found by searching LQ CAM 100 with the matching LQ index, the bit in V field 101 asserted and the bit in H/L field 102 asserted (to indicate that this is an LQ index).

If the memory line is still "Shared" as a result of the first request in LQ, the new request can still execute out of the local registers, as before. If, however, the line became "Private", it is recalled and the last entry for the memory line retrieved from LQ is written into the HQ (at the next free HQ location), as the head of the linked list waiting for the new response. If this was the last item in the linked list for that address (its index equaled the value in tail field 94 in the corresponding HQ entry), the bit in L field 93 for the new HQ entry for that address is asserted and the value in tail field 94 is "don't care". If it is not the last item in the linked list for the memory line, the bit in L field 93 is unasserted and the value in tail field 94 is left the same as for the previous HQ entry for the memory line. This assumes that no new requests have been received for the memory line. The next request for the memory line stored in the LQ is found by searching LQ CAM 100 with the last matching LQ index for the memory line, the bit in V filed 101 asserted and the bit in H/L field 102 asserted (to indicate that this is a LQ index). The entry found by the search is updated by placing in link field 103 the index of the new entry for the memory line in the HQ. The bit in H/L field 102 is unasserted.

While the present invention has been illustrated using embodiments of the DRQ shown in FIG. 2 and FIG. 11, the principles of the present invention can be expanded to any system which uses linked lists.

Figure 12:
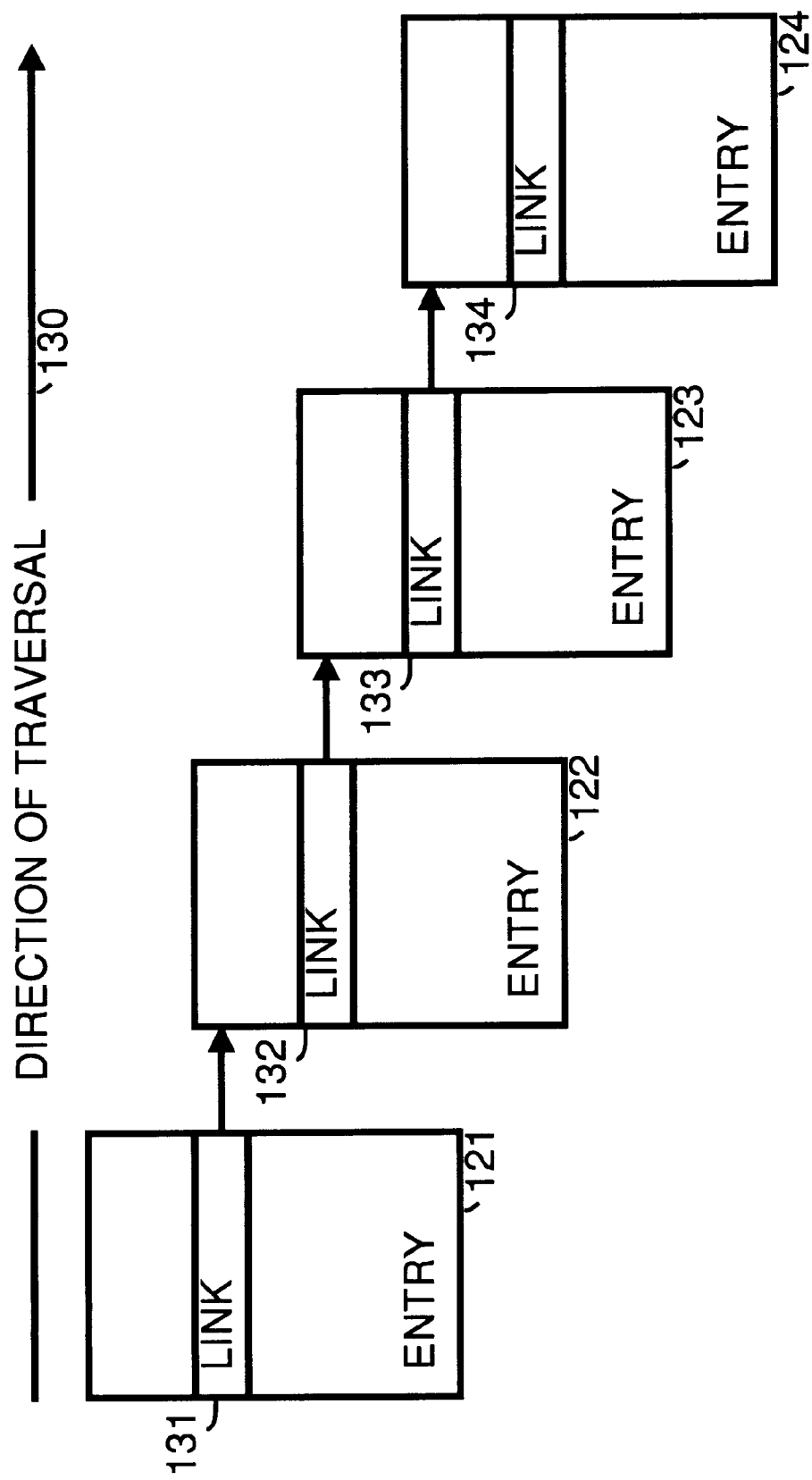
FIG. 12 shows a simplified linked list according to the prior art.
Figure 13:
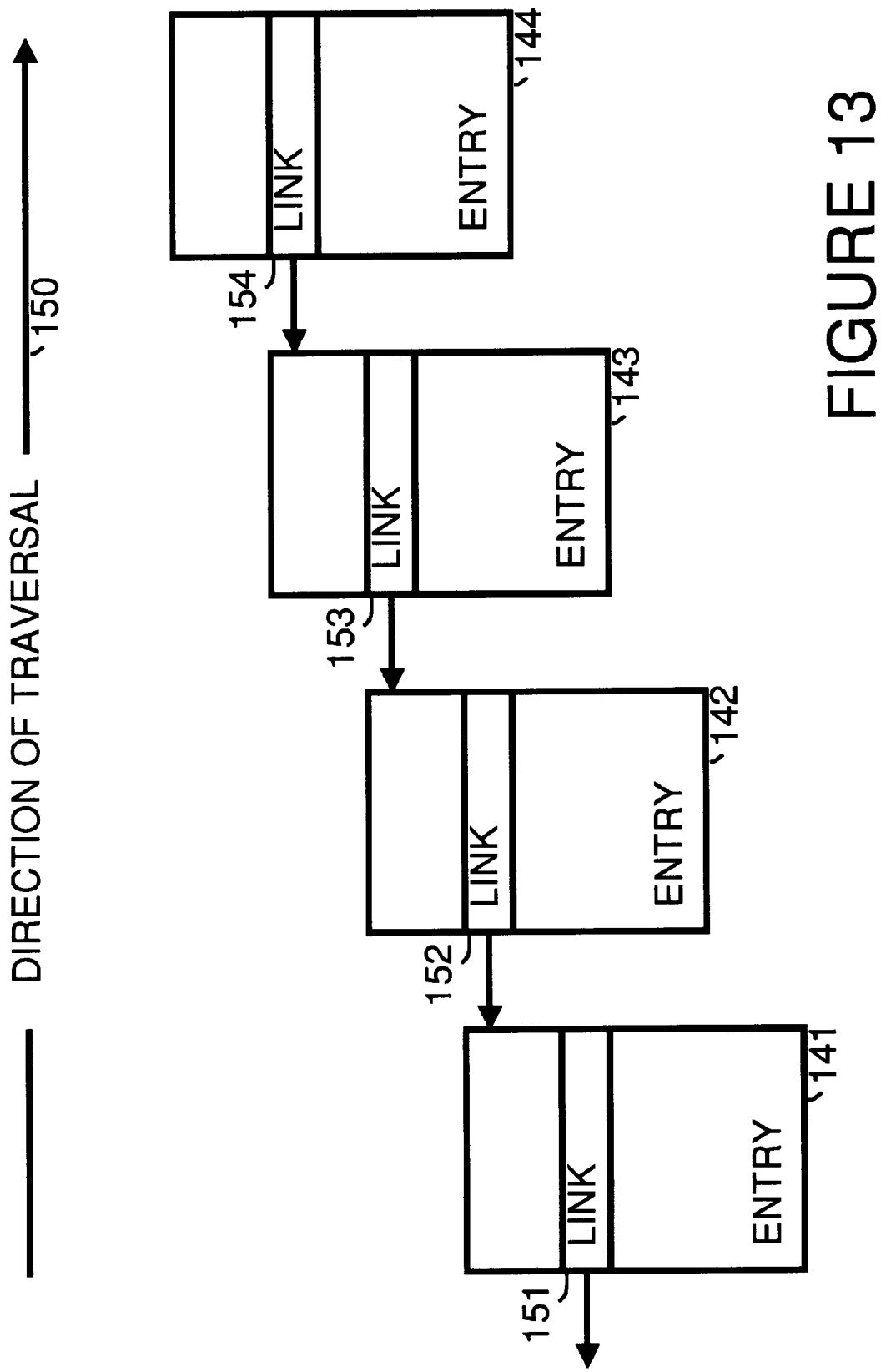
FIG. 13 shows a simplified linked list constructed in accordance with a preferred embodiment of the present invention.

FIG. 12 and FIG. 13 illustrate an essential difference between linked lists in accordance with the prior art versus a linked list in accordance with the preferred embodiment of the present invention.

FIG. 12 illustrates a linked list in accordance with the prior art. A linked list entry 121 includes a link 131. Link 131 is an index/address which identifies a next entry 122 of the linked list. Linked list entry 122 includes a link 132. Link 132 is an index/address which identifies a next entry 123 of the linked list. Linked list entry 123 includes a link 133. Link 133 is an index/address which identifies a next entry 124 of the linked list. Linked list entry 124 includes a link 134. Link 134 is an index/address which identifies a next entry of the linked list. And so on.

When traversing the linked list in a direction of traversal 130, the link of the current entry is used to access the next entry. Thus, link 131 is used to access entry 122. Link 132 is used to access entry 123. Link 133 is used to access entry 124. And so on. From an implementation point of view this means that when a new entry in the list is created, the previous tail entry has to be modified (only now the link field of the previous tail entry becomes known).

FIG. 13 illustrates a linked list in accordance with the present invention. The linked list shown in FIG. 13 uses an associative search for locating entries, whereas the linked list in FIG. 12 uses memory-like addressing.

In FIG. 13, a linked list entry 141 is a head of the linked list. Since linked list entry 141 is the head of the link list, the value held in a link 152 is a "don't care". A next entry 142 of the linked list includes a link 152. Link 152 is an index/address which points back to previous linked list entry 141. A next entry 143 of the linked list includes a link 153. Link 153 is an index/address which points back to previous linked list entry 142. A next entry 144 of the linked list includes a link 154. Link 154 is an index/address which points back to previous linked list entry 144. And so on.

When traversing the linked list in a direction of traversal 150, a search is done on the index of the current entry in order to access the next entry. This succeeds because the index of the current index is stored in the link of the next entry. Thus, from entry 141, the index of entry 141, stored in link 152, is used to access entry 142. From entry 142, the index of entry 142 stored in link 153 is used to access entry 143. From entry 143, the index of entry 143 stored in link 154 is used to access entry 144. And so on. The reason the index of the present entry from within the next entry can be efficiently used to locate the next entry is because, as illustrated above, the appropriate fields of the linked list entry is stored in content addressable memory (CAM). This allows for the performance of an associative search instead of a direct search. In this embodiment, when adding an additional entry to the linked list, there is no need to modify the previous tail entry in the list, because only the tail (last) bit needs to be reset. Resetting the tail (last) bit may be performed as a by product of the CAM search using a special cell for this bit. The result is significant savings in the necessary bandwidth for the block implementing the linked list in hardware.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A linked list structure in a computing system comprising:
    a first entry in the linked list; and
    additional entries in the linked list, each additional entry including a link reference to a prior entry in the linked list, the link reference for each additional entry all being stored within a content addressable memory which allows a next additional entry to be accessed by performing a content search using the link reference to the prior entry within the next additional entry;
    wherein there is stored in the content addressable memory for the first entry and for each of the additional entries the following fields:
        a head field which contains a value which is true for the first entry and which is false for each of the additional entries;
        a tail field which contains a value which is true for a last entry in the linked list;
        an address field which contains an address for a memory line; and
        a validity bit which indicates whether an associated additional entry is valid.

2. A linked list structure in a computing system comprising:
    a first entry in the linked list; and,
    additional entries in the linked list, each additional entry including a link reference to a prior entry in the linked list, the link reference for each additional entry all being stored within a content addressable memory which allows a next additional entry to be accessed by performing a content search using the link reference to the prior entry within the next additional entry;
    wherein there is stored in a head queue content addressable memory, for the first entry, the following fields:
        an address field which contains an address for a memory line; and
        a validity bit which indicates whether an associated additional entry is valid;
        wherein the head queue content addressable memory is in addition to the content addressable memory.

3. A linked list structure as in claim 2 wherein additional information for the first entry is stored in a random access memory.

4. A linked list structure as in claim 3 wherein the additional information includes:
    an operation to be performed on a memory line;
    a last field which contains a value which is true when the first entry is a last entry in the linked list; and,
    a tail field which, when valid, contains an index for the last entry in the linked list.

5. A linked list structure as in claim 3 wherein the additional information additionally includes a data field which, when valid, stores current data for the memory line.

6. A linked list structure as in claim 2 wherein there is stored in the content addressable memory, for each of the additional entries, the following field:
    a head/link field which contains a value which indicates whether the prior entry referenced by the link reference resides in the content addressable memory or in the head queue content addressable memory.

7. A computing system comprising:
    a main memory, the main memory including a cache coherence mechanism;
    a memory controller comprising; and,
    a request queue, the request queue storing a plurality of linked lists, each linked list comprising:
        a first entry, and
        additional entries, each additional entry including a link reference to a prior entry in the linked list, the link reference for each additional entry all being stored within a content addressable memory which allows a next additional entry to be accessed by performing a content search using the link reference to the prior entry within the next additional entry.

8. A computing system as in claim 7 wherein the content addressable memory also stores for each additional entry a validity bit which indicates whether an associated additional entry is valid.

9. A computing system as in claim 7 wherein additional information for each additional entry is stored in a random access memory, the additional information including an operation to be performed on a memory line.

10. A computing system as in claim 7 wherein there is stored in the content addressable memory for the first entry and for each of the additional entries the following fields:
    a head field which contains a value which is true for the first entry and which is false for each of the additional entries;

a tail field which contains a value which is true for a last entry in the linked list;

an address field which contains an address for a memory line; and, a validity bit which indicates whether an associated additional entry is valid.

11. A computing system as in claim 7 wherein there is stored in a head queue content addressable memory, for the first entry, the following fields:

an address field which contains an address for a memory line; and a validity bit which indicates whether an associated additional entry is valid;

wherein the head queue content addressable memory is in addition to the content addressable memory.

12. A computing system as in claim 11 wherein additional information for the entry is stored in a random access memory, the additional information including:

an operation to be performed on a memory line;

a last field which contains a value which is true when the first entry is a last entry in the linked list; and, a tail field which, when valid, contains an index for the last entry in the linked list.

13. A computing system as in claim 7 wherein the cache coherence mechanism is a directory structure.

* * * * *